US012554291B2

(12) United States Patent
Tran et al.

(10) Patent No.: US 12,554,291 B2
(45) Date of Patent: Feb. 17, 2026

(54) INFORMATION PROCESSING APPARATUS AND CONTROL METHOD

(71) Applicant: Lenovo (Singapore) Pte. Ltd., Singapore (SG)

(72) Inventors: Thixuanmai Tran, Kanagawa (JP); Hironari Nishino, Kanagawa (JP); Masaki Matsubara, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/920,296

(22) Filed: Oct. 18, 2024

(65) Prior Publication Data
US 2025/0216912 A1    Jul. 3, 2025

(30) Foreign Application Priority Data
Dec. 28, 2023   (JP) ................ 2023-222894

(51) Int. Cl.
*G06F 1/16*       (2006.01)
*G06F 3/0354*     (2013.01)
(Continued)

(52) U.S. Cl.
CPC ........ *G06F 1/1681* (2013.01); *G06F 3/03547* (2013.01); *G06F 3/038* (2013.01); *G06F 3/0416* (2013.01)

(58) Field of Classification Search
CPC ...... G06F 1/1616; G06F 1/1618; G06F 1/162; G06F 1/1677; G06F 1/1681;
(Continued)

(56) References Cited

U.S. PATENT DOCUMENTS

2013/0135352 A1*  5/2013  Matsuda ............... G06F 3/14
                                                        345/659
2014/0043259 A1*  2/2014  Park ..................... G06F 1/1618
                                                        345/173
(Continued)

FOREIGN PATENT DOCUMENTS

JP        2012-69011 A      4/2012
JP        2023-032086 A     3/2023
(Continued)

*Primary Examiner* — Ryan A Lubit
(74) *Attorney, Agent, or Firm* — Osha Bergman Watanabe & Burton LLP (57) ABSTRACT

An information processing apparatus includes: a memory which temporarily stores a program of a system; a first processor which executes the program of the system; a second processor provided separately from the first processor to execute processing regardless of an operating state of the first processor; an operator for detecting a physical press; and an operation detection unit which acquires a detection signal by the operator and outputs, to the first processor, information for executing processing based on the acquired detection signal. The second processor controls whether or not to stop operation of the operation detection unit, and when stopping the operation of the operation detection unit, the second processor acquires the detection signal by the operator without going through the operation detection unit, and executes processing based on the acquired detection signal.

8 Claims, 7 Drawing Sheets

(51) Int. Cl.
*G06F 3/038* (2013.01)
*G06F 3/041* (2006.01)

(58) Field of Classification Search
CPC .... G06F 3/03547; G06F 3/038; G06F 3/0416;
G06F 2200/1614
See application file for complete search history.

(56) References Cited

U.S. PATENT DOCUMENTS

| | | | |
|---|---|---|---|
| 2014/0281444 A1* | 9/2014 | Waltermann | G06F 1/162 |
| | | | 713/1 |
| 2015/0135108 A1* | 5/2015 | Pope | G06F 1/1671 |
| | | | 715/767 |
| 2016/0004432 A1* | 1/2016 | Bernstein | G06F 3/0481 |
| | | | 715/769 |
| 2016/0274722 A1* | 9/2016 | Putzolu | G06F 3/0416 |
| 2020/0125528 A1* | 4/2020 | Hutton | G06F 15/0291 |
| 2024/0281309 A1* | 8/2024 | Chang | G06F 1/3215 |

FOREIGN PATENT DOCUMENTS

| | | |
|---|---|---|
| WO | 2006-046556 A1 | 5/2006 |
| WO | 2015-060280 A1 | 4/2015 |

\* cited by examiner

INFORMATION PROCESSING APPARATUS AND CONTROL METHOD

CROSS-REFERENCE TO RELATED APPLICATIONS

This application claims priority to Japanese Patent Application No. 2023-222894 filed on Dec. 28, 2023, the contents of which are hereby incorporated herein by reference in their entirety.

TECHNICAL FIELD

The present invention relates to an information processing apparatus and a control method.

BACKGROUND

In a laptop personal computer (hereinafter called a laptop PC), one of the sides of a display chassis with a display unit provided thereon and one of the sides of a device chassis with an input device such as a keyboard provided thereon are joined (coupled) through a hinge mechanism, and the display chassis and the device chassis are rotatable relative to each other around the rotation axis of the hinge mechanism. The laptop PC is generally used in a state where the display chassis and the device chassis are open, but the laptop PC is sometimes used in a tablet mode in which the display chassis and the device chassis are opened up to 360° (for example, Japanese Unexamined Patent Application Publication No. 2023-032086).

Further, there is an information device such as a laptop PC equipped with a function to detect the orientation of a display screen in use and automatically change (rotate) the display orientation. This function is convenient because there is no need to change the display settings every time a user changes the orientation of the display screen in use.

However, when the laptop PC is used in the tablet mode as described above, it is assumed that the display screen faces various directions, such as a case where the user uses the laptop PC while lying down on a bed and a case where the user turns the display screen in a direction of another user, compared to a case where the laptop PC is placed on a desk and used. In this case, the automatically changed display orientation may not be an orientation necessarily appropriate for the user.

For example, when the user lies down sideways on the bed while looking at the display screen, the orientation of the user himself or herself relative to the display screen does not change, but the orientation of the display is automatically rotated because the display screen itself is rotated, and hence the display orientation may not be a display orientation expected by the user. In this case, it takes a lot of time because the user is required to try to change the orientation of the laptop PC or change the posture of the user himself or herself so that the display will be in an expected orientation, or the user is required to open a settings menu or the like to disable a function of automatically changing (rotating) the display orientation whenever the user wants to correct or change the display orientation. Further, when the user turns the display screen in the direction of another user, the direction of the display screen becomes unstable, and it may take time until the display orientation is stabilized. Thus, even in the function that basically performs convenient processing, the processing may not be processing appropriate for the user depending on the usage form of the laptop PC, and it takes time and effort to deal with it.

SUMMARY

One or more embodiments of the present invention provide an information processing apparatus and a control method capable of making a switch so that a user can perform appropriate processing with a simple operation.

An information processing apparatus according to one or more embodiments of the present invention includes: a memory which temporarily stores a program of a system; a first processor which executes the program of the system; a second processor provided separately from the first processor to execute processing regardless of the operating state of the first processor; an operator for detecting a physical press; and an operation detection unit which acquires a detection signal by the operator and outputs, to the first processor, information for executing processing based on the acquired detection signal, wherein the second processor controls whether or not to stop the operation of the operation detection unit, and when stopping the operation of the operation detection unit, the second processor acquires the detection signal by the operator without going through the operation detection unit, and executes processing based on the acquired detection signal.

The above information processing apparatus may further include: a first chassis with a display unit provided on one surface; a second chassis with the operator provided on one surface; and a hinge mechanism through which one side of the first chassis and one side of the second chassis are so coupled that the first chassis and the second chassis are rotatable around an axis of a coupling part, wherein the second processor detects a rotation state between the first chassis and the second chassis by the hinge mechanism, and stops the operation of the operation detection unit based on the detected rotation state.

The above information processing apparatus may also be such that, when detecting that the rotation state becomes a state where the other surface of the first chassis and the other surface of the second chassis face and overlap each other, the second processor stops the operation of the operation detection unit.

The above information processing apparatus may further be such that the operator is provided in association with a touch pad that detects an operation position by a touch operation in a specific area on a surface of the second chassis with the operator provided thereon, and the operation detection unit further acquires a detection signal by the touch pad in addition to the detection signal by the operator, and outputs, to the first processor, information for executing processing based on the acquired detection signals.

Further, the above information processing apparatus may be such that, when stopping the operation of the operation detection unit, the second processor switches specific processing based on the detection signal acquired from the operator without going through the operation detection unit.

The above information processing apparatus may further include a sensor for detecting an orientation of the information processing apparatus, wherein the first processor executes display direction change processing to change a display orientation of the display unit depending on the orientation of the information processing apparatus detected by the sensor, and when stopping the operation of the operation detection unit, the second processor switches the display direction change processing based on the detection signal acquired from the operator without going through the operation detection unit.

Further, the above information processing apparatus may be such that, when stopping the operation of the operation detection unit, the second processor switches whether or not to perform the display direction change processing based on the detection signal acquired from the operator without going through the operation detection unit.

A control method according to one or more embodiments of the present invention is a control method for an information processing apparatus including: a memory which temporarily stores a program of a system; a first processor which executes the program of the system; a second processor provided separately from the first processor to execute processing regardless of the operating state of the first processor; an operator for detecting a physical press; and an operation detection unit which acquires a detection signal by the operator and outputs, to the first processor, information for executing processing based on the acquired detection signal, the control method including: a step of causing the second processor to control whether or not to stop the operation of the operation detection unit; a step in which, when stopping the operation of the operation detection unit, the second processor acquires the detection signal by the operator without going through the operation detection unit; and a step of causing the second processor to execute processing based on the acquired detection signal.

One or more embodiments of the present invention can make a switch so that a user can perform appropriate processing with a simple operation.

DETAILED DESCRIPTION

Embodiments of the present invention will be described in detail below with reference to the accompanying drawings.

First, an overview of an information processing apparatus according to the one or more embodiments will be described.

[Overview of Information Processing Apparatus]

Figure 1:
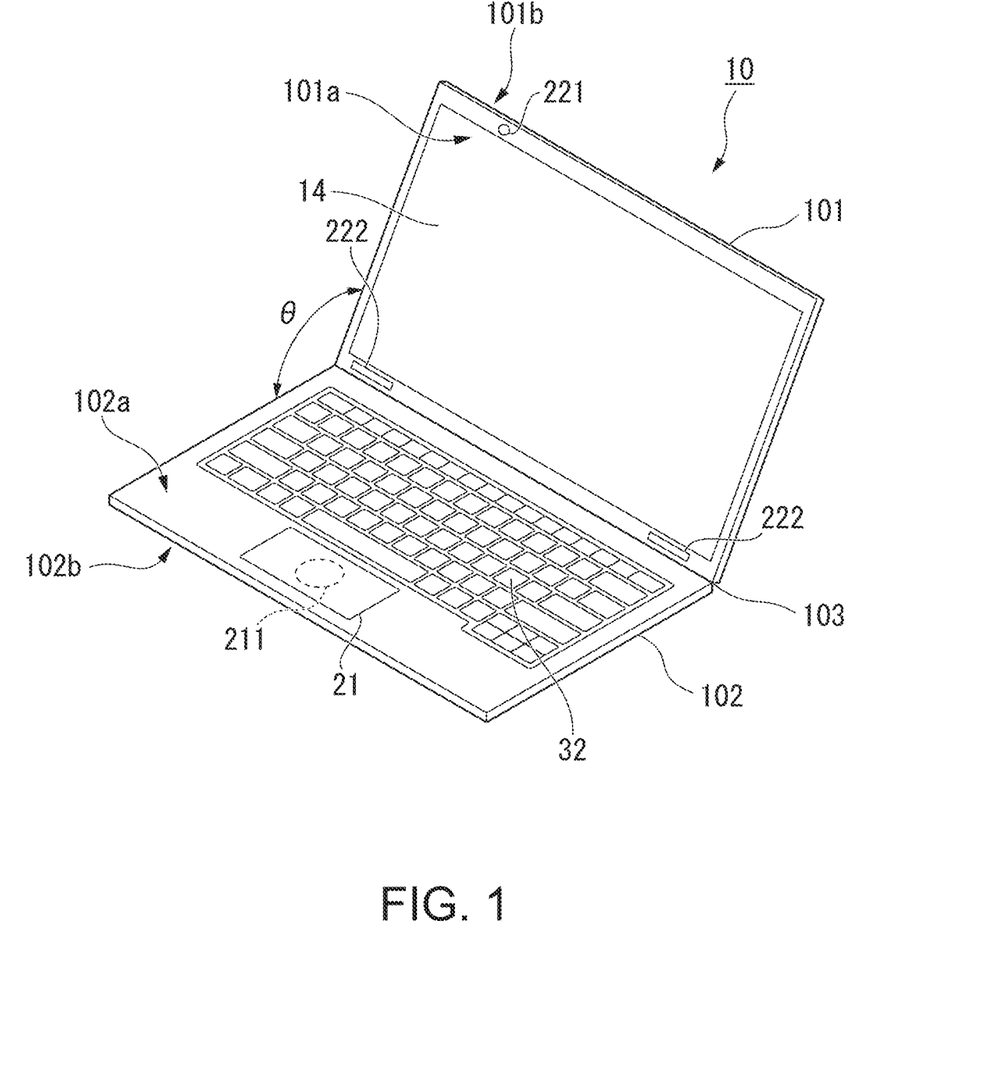
FIG. 1 is a perspective view illustrating an example of the appearance of an information processing apparatus according to one or more embodiments.

FIG. 1 is a perspective view illustrating the appearance of the information processing apparatus according to one or more embodiments.

An information processing apparatus 10 illustrated is a clamshell-type laptop PC (Personal Computer). The information processing apparatus 10 includes a display chassis 101 with a display unit 14 (display) provided on one surface, a device chassis 102 with a touch pad 21 and a keyboard 32 provided on one surface, and a hinge mechanism 103. The display chassis 101 and the device chassis 102 are chassis having a substantially rectangular plate shape (for example, a flat plate shape).

The hinge mechanism 103 couples (joins) one side (one of the sides) of the display chassis 101 and one side (one of the sides) of the device chassis 102 in such a manner that the display chassis 101 and the device chassis 102 are rotatable relative to each other around the axis of this coupling part (the axis of rotation of the hinge mechanism 103). A state where an open angle θ between the display chassis 101 and the device chassis 102 around the rotation angle is substantially 0° is a state where the display chassis 101 and the device chassis 102 overlap each other and are closed (called the "closed state"). A state opposite to the closed state, where the display chassis 101 and the device chassis 102 are open, is called the "open state." The open state is a state where the display chassis 101 and the device chassis 102 are rotated relative to each other until the open angle θ exceeds a preset threshold value (for example, 10°). The appearance of the information processing apparatus 10 illustrated in FIG. 1 is an example of the open state.

Here, the surface of the display chassis 101 with the display unit 14 provided thereon is referred to as a display surface 101a, and a surface on the opposite side of the display surface 101a is referred to as a top surface 101b. Further, the surface of the device chassis 102 with the touch pad 21 and the keyboard 32 provided thereon is referred to as a keyboard surface 102a, and a surface on the opposite side of the keyboard surface 102a is referred to as a bottom surface 102b. In the closed state, the display surface 101a and the keyboard surface 102a are surfaces on the face-to-face side. In the illustrated example, the keyboard 32 is a physical keyboard with multiple keys (examples of operating elements) arranged thereon to accept user operations. Note that the touch pad and the like other than the keyboard 32 may also be provided on the keyboard surface 102a.

In the closed state, since the display surface 101a of the display chassis 101 and the keyboard surface 102a of the device chassis 102 face and overlap each other, the information processing apparatus 10 is in such a state that the display unit 14 is not visible and the touch pad 21 and the keyboard 32 cannot be operated. On the other hand, in the open state, the display unit 14 is visible and the operation on the touch pad 21 and the keyboard 32 are operable.

Further, in the information processing apparatus 10 illustrated in FIG. 1, a microphone 221 and speakers 222 are provided on the display surface 101a of the display chassis 101. Further, the touch pad 21 detects an operation position by a touch operation in a planar detection area (an area indicated by reference numeral 21) for detecting the touch operation. Further, the touch pad 21 is equipped with a click switch 211 for detecting a physical press on the touch pad 21 (on the area indicated by reference numeral 21). The click switch 211 is provided on the lower side of the detection area (the area indicated by reference numeral 21) of the touch pad 21.

The information processing apparatus 10 is generally used in the open state in which the display chassis 101 and the device chassis 102 are open, but even in the open state, there are different usage forms depending on the open angle θ.

Figure 2A:
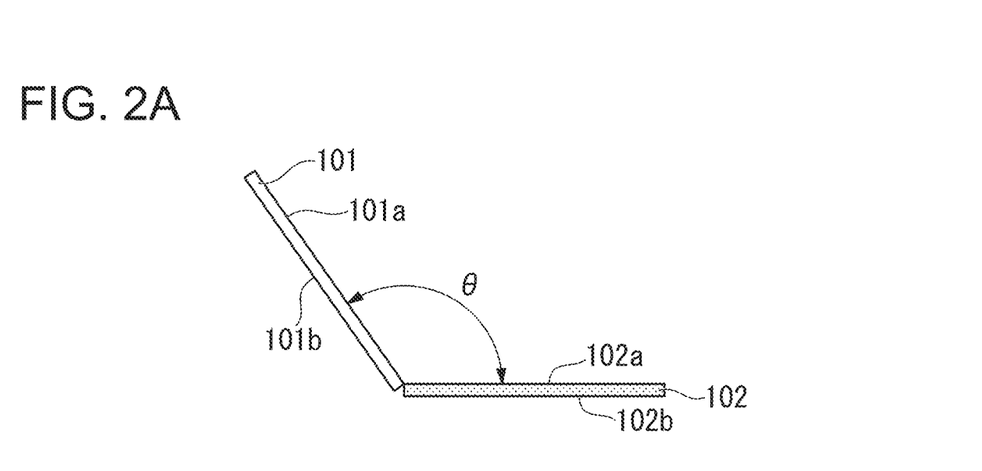
FIGS. 2A-2B are diagrams illustrating examples of usage forms of the information processing apparatus according to one or more embodiments.
Figure 2B:
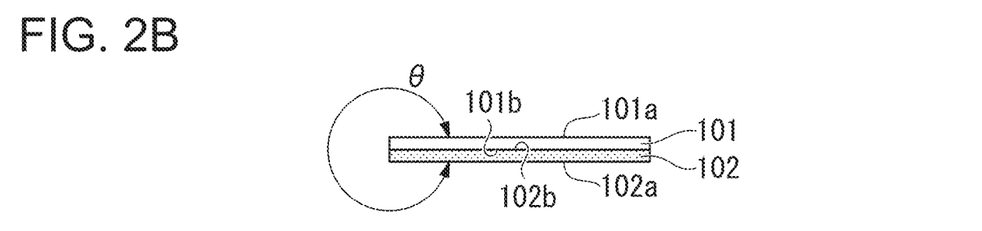

FIGS. 2A-2B are diagrams illustrating examples of usage forms of the information processing apparatus 10 according to one or more embodiments. FIG. 2A illustrates a general usage form of the laptop PC as illustrated in FIG. 1 among usage forms in the open state. The information processing apparatus 10 is often used, for example, at an open angle θ of about 90° to 140°. This usage form is called a "clamshell mode." On the other hand, FIG. 2B illustrates a usage form in which the display chassis 101 and the device chassis 102 are further opened until the open angle θ becomes about 360°, that is, the display chassis 101 and the device chassis 102 are further rotated until the top surface 101b of the display chassis 101 and the bottom surface 102b of the device chassis 102 face and overlap each other. In this usage form illustrated in FIG. 2B, since the information processing apparatus 10 can be used in the same way as a tablet PC, it is called the "tablet mode."

Further, the information processing apparatus 10 has a function of detecting the orientation of the information processing apparatus 10 and automatically rotating the display orientation when the orientation of the information processing apparatus 10 (that is, the orientation of the display screen of the display unit 14) is changed vertically or horizontally (hereinafter called the "automatic display rotation function").

Figure 3:
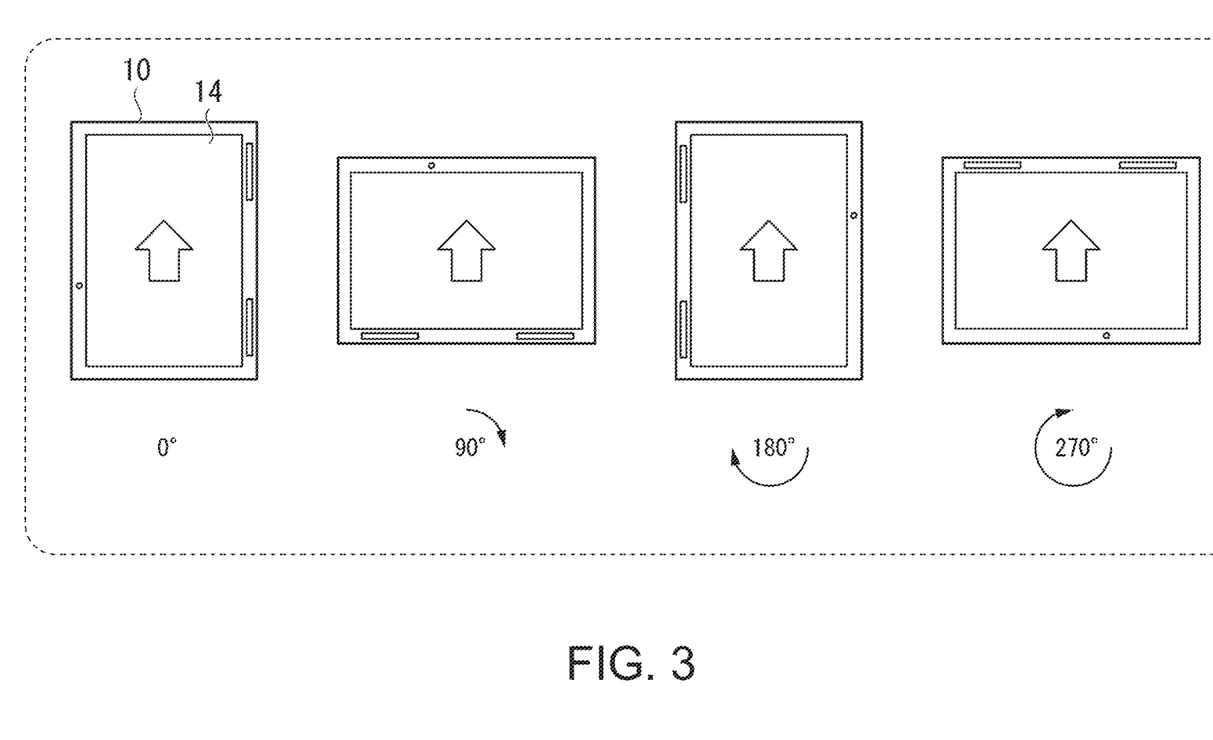
FIG. 3 is an explanatory diagram of an automatic display rotation function according to one or more embodiments.

FIG. 3 is an explanatory diagram of the automatic display rotation function according to one or more embodiments. In FIG. 3, display orientations of the display screen when the display screen of the display unit 14 of the information processing apparatus 10 is rotated 90°, 180°, and 270° to the right from 0° are indicated by arrows, respectively. The display orientation of the display screen at 0° (portrait screen) is an orientation in which a direction indicated by the arrow is up. For example, the upward direction indicated by the arrow is a direction opposite to the direction of gravity.

When the display screen is rotated 90° to the right from 0° (portrait screen) and becomes a landscape screen, the information processing apparatus 10 can rotate the display orientation 90° to the left even from the landscape screen to make the display orientation become the same display orientation as the orientation at 0° (portrait screen) (that is, to make the direction opposite to the direction of gravity become the upward direction). Further, when the display screen is rotated 180° to the right from 0° (portrait screen) to make the display orientation become an upside-down portrait screen, the information processing apparatus 10 can rotate the display orientation 180° to the left even from the upside-down portrait screen to make the display orientation become the same display orientation as the orientation at 0° (portrait screen) (that is, to make the direction opposite to the direction of gravity become the upward direction). Further, when the display screen is rotated 270° to the right from 0° (portrait screen) to make the display orientation become a landscape screen on which the top and bottom are opposite to those of the landscape screen when the display screen is rotated 90° to the right, the information processing apparatus 10 can rotate the display orientation 270° to the left to make the display orientation become the same display orientation as the orientation at 0° (portrait screen) (that is, to make the direction opposite to the direction of gravity become the upward direction). Note that the state where the display screen is rotated 270° to the right is the same as the state where the display screen is rotated 90° to the left.

This automatic display rotation function is convenient because there is no need to change the display settings every time the user changes the orientation of the display screen in use. Especially, when using the information processing apparatus 10 in the tablet mode, the automatic display rotation function is convenient because there are many scenes that the user changes the orientation of the display screen in use. However, when using the information processing apparatus 10 in the tablet mode, the direction of the display screen tends to be unstable, compared to the case when using the information processing apparatus 10 in the clamshell mode by placing it on the desk or the like, and hence the display orientation may be changed against the user's intention. In this case, it may take time until the display orientation is stabilized to a display orientation expected by the user. Further, in the tablet mode, the user may use the information processing apparatus 10 while lying down sideways on the bed. In this case, the relative orientation between the user himself or herself and the display screen does not change before lying down, but the display orientation is automatically rotated because the display screen itself is rotating and hence the display orientation may not be the display orientation expected by the user.

Thus, the automatic display rotation function is a function that basically performs convenient processing, but when the user uses the information processing apparatus 10 in the tablet mode, the display orientation may not always be appropriate depending on the scene, and it may be better if the automatic display rotation function does not work. Therefore, the information processing apparatus 10 according to one or more embodiments can allow the user to lock (fix) the display orientation with a simple operation in order to disable the automatic display rotation function. Specifically, the click switch 211 of the touch pad 21 placed on the back side (behind the display screen) when the user holds the information processing apparatus 10 in the tablet mode is used.

Figure 4A:
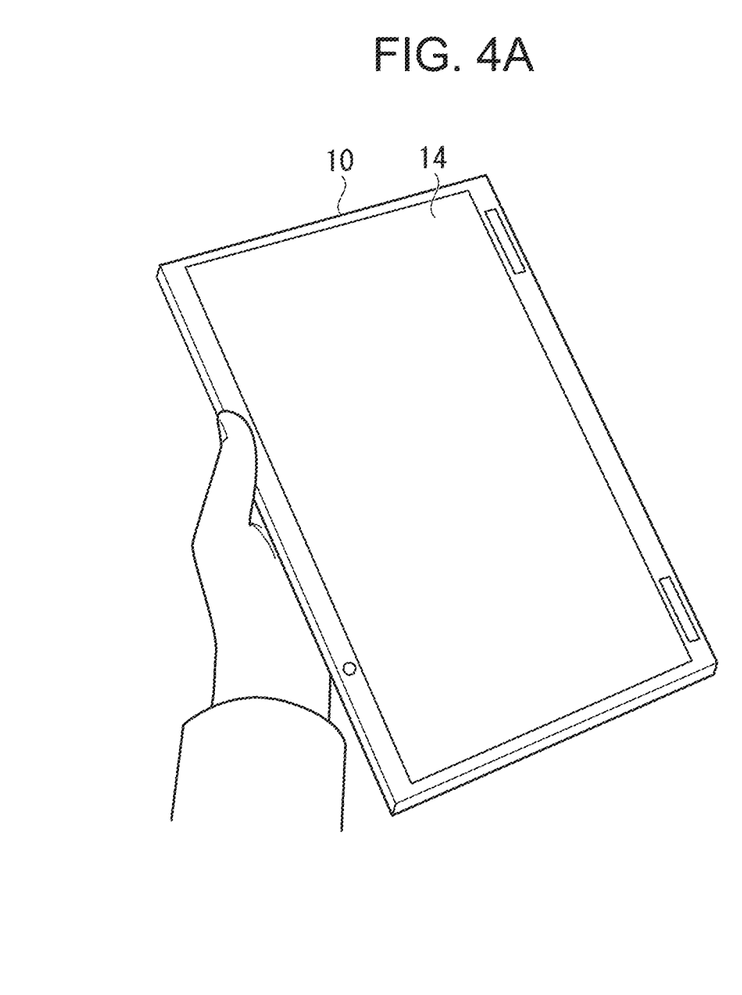
FIGS. 4A-4B are diagrams illustrating an example of a state where the information processing apparatus according to one or more embodiments is held in a tablet mode.
Figure 4B:
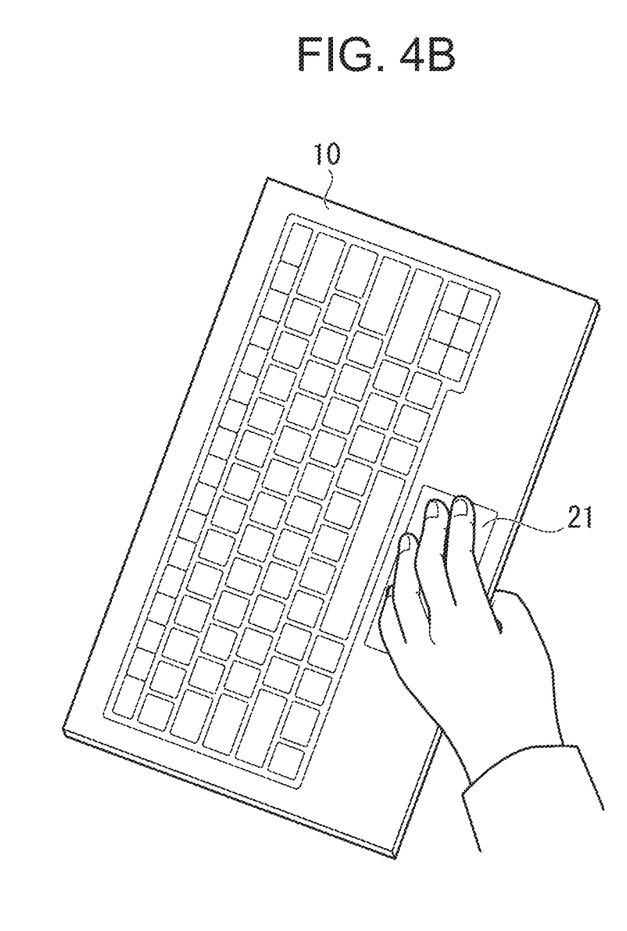

FIGS. 4A-4B are diagrams illustrating an example of a state where the information processing apparatus 10 according to one or more embodiments is held in the tablet mode. FIG. 4A illustrates the side of the display surface 101a when the user is holding the information processing apparatus 10 in the tablet mode. On the other hand, FIG. 4B illustrates the side of the keyboard surface 102a as the back side of the display surface 101a when the user is holding the information processing apparatus 10 in the tablet mode. In the tablet mode, the user can easily press the touch pad 21 provided on the side of the keyboard surface 102a with a gripping hand while holding the information processing apparatus 10. For example, the information processing apparatus 10 locks (fixes) the display orientation while the user is pressing the touch pad 21, that is, while pressing the click switch 211 to control the automatic display rotation function to disabled.

Here, in the tablet mode, the function of the touch pad 21 is turned off in the first place because the touch pad 21 on the back side when the user is holding the information processing apparatus 10 is easy to be operated erroneously. For example, in the tablet mode, the information processing apparatus 10 turns off (stops the operation of) a touch pad IC (Integrated Circuit) to detect a touch operation on the touch pad 21 and detect a press of the click switch 211, and reduces power consumption.

Therefore, the information processing apparatus 10 uses an EC (Embedded Controller) when detecting a press on the click switch 211 in the tablet mode. For example, in the information processing apparatus 10, the EC acquires a detection signal to detect the press on the click switch 211 in the tablet mode without going through the touch pad IC to control the automatic display rotation function to disabled. Thus, in the tablet mode, when the user does not want to change the display orientation, the user can disable the automatic display rotation function with such a simple operation as to press the click switch 211 on the back side with the gripping hand with which the information processing apparatus 10 is being held to lock the display orientation. In the following, configurations of the information processing apparatus 10 will be described in detail.

[Configurations of Information Processing Apparatus]

Figure 5:
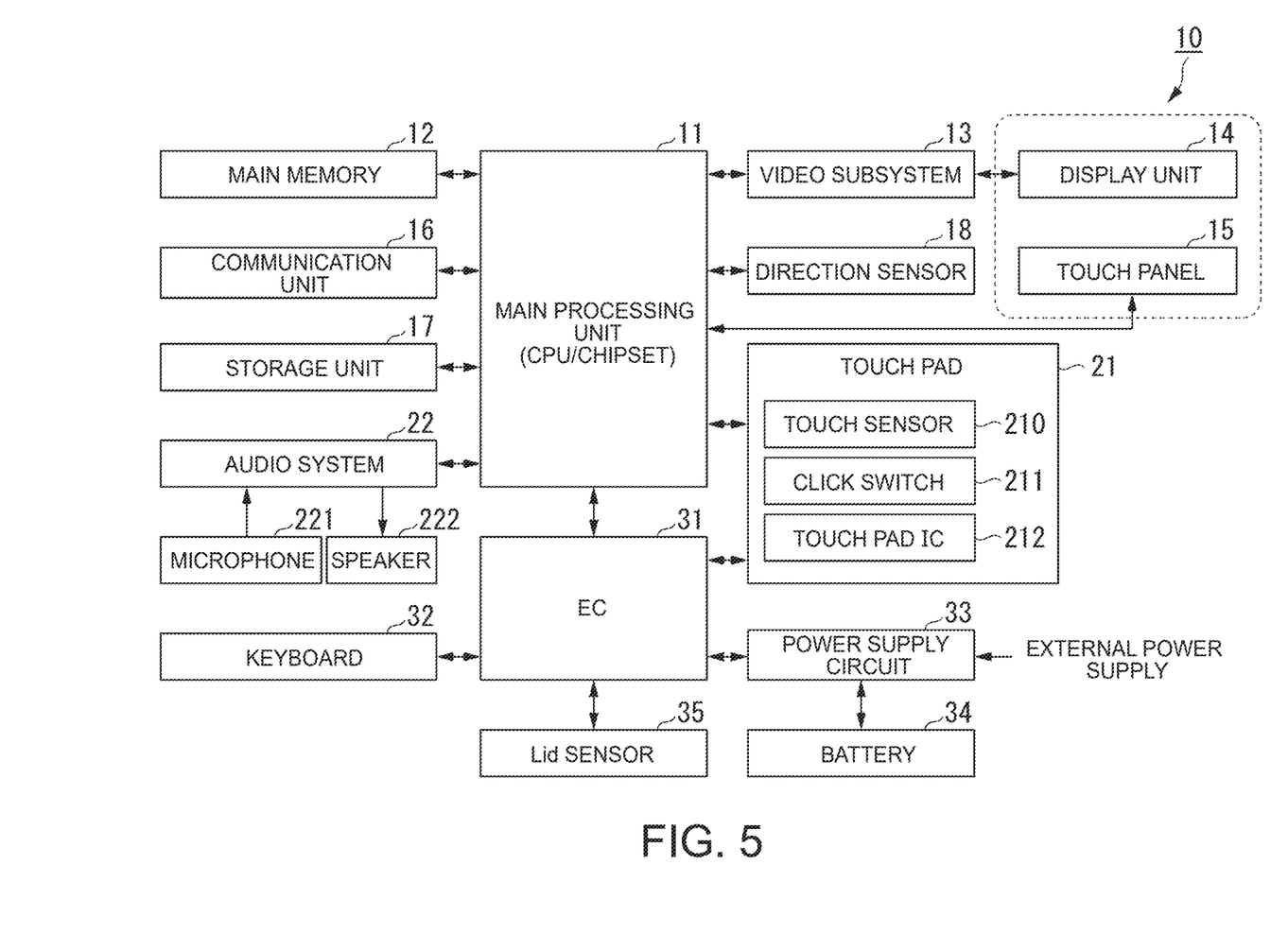
FIG. 5 is a block diagram illustrating an example of the hardware configuration of the information processing apparatus according to one or more embodiments.

Referring first to FIG. 5, the main hardware configuration of the information processing apparatus 10 will be described.

FIG. 5 is a block diagram illustrating an example of the hardware configuration of the information processing apparatus 10 according to one or more embodiments. Note that components corresponding to respective units in FIG. 1 are given the same reference numerals in FIG. 5.

The information processing apparatus 10 includes a main processing unit 11, a main memory 12, a video subsystem 13, a display unit 14, a touch panel 15, a communication unit 16, a storage unit 17, a direction sensor 18, the touch pad 21, an audio system 22, an EC 31, the keyboard 32, a power supply circuit 33, a battery 34, and a Lid sensor 35.

The main processing unit 11 is configured to include processors such as a CPU (Central Processing Unit) and a chipset. The CPU executes various kinds of arithmetic processing by program control to control the entire information processing apparatus 10. For example, the main processing unit 11 executes a program of a system such as an OS (Operating System). Further, the CPU executes processing based on various drivers, various services/utilities, and applications executable on the OS. The chipset includes controllers such as a USB (Universal Serial Bus), serial ATA (AT Attachment), an SPI (Serial Peripheral Interface) bus, a PCI (Peripheral Component Interconnect) bus, a PCI-Express bus, and an LPC (Low Pin Count) bus, and plural devices are connected thereto. For example, the plural devices include the storage unit 17, the audio system 22, the communication unit 16, and the EC 31.

The main memory 12 is a writable memory used as reading areas of execution programs of the main processing unit 11 or working areas to which processed data of the execution programs are written. The main memory 12 is composed, for example, of plural DRAM (Dynamic Random Access Memory) chips. The execution programs include the OS, various drivers for hardware-operating peripheral devices, various services/utilities, application programs, and the like.

The video subsystem 13 is a subsystem for implementing a function related to image display, which includes a video controller. This video controller processes a drawing command from the main processing unit 11, writes processed drawing information into a video memory, and reads this drawing information from the video memory to output the drawing information to the display unit 14 as drawing data (display data).

For example, the display unit 14 is configured to include a liquid crystal display or an organic EL display, and the like, to display images and information on a display screen based on the drawing data (display data) output from the video subsystem 13.

The touch panel 15 is configured to be integrated with the display unit 14. The touch panel 15 is configured to include a touch sensor to detect a touch operation (operation position) on the display screen of the display unit 14.

The communication unit 16 is connected to a network by a wireless LAN (Local Area Network) such as Wi-Fi (registered trademark) or a wired LAN using an Ethernet cable to perform data communication. For example, when receiving data from the network, the communication unit 16 generates an event trigger indicating that the data is received. Further, the communication unit 16 may also perform communication with the peripheral devices by near field communication such as Bluetooth (registered trademark).

The storage unit 17 is configured to include an HDD (Hard Disk Drive) or an SSD (Solid State Drive), and the like. For example, the storage unit 17 stores the OS, various drivers, various services/utilities, application programs, and various data.

The direction sensor 18 is a sensor for detecting the orientation of the information processing apparatus 10, that is, for detecting the orientation of the display screen of the display unit 14. For example, the direction sensor 18 includes at least one of an acceleration sensor, an angular velocity sensor, a gravity sensor, and the like.

The touch pad 21 is an input device having the same function as a mouse to accept an operation such as cursor movement or clicking. For example, the touch pad 21 is configured to include a touch sensor 210, a click switch 211, and a touch pad IC 212.

The touch sensor 210 has a planer detection area (the area of the touch pad 21 in FIG. 1) to output a detection signal depending on the operation position by the touch operation. The click switch 211 is an operator for detecting a physical press (a click operation by the user). The click switch 211 is provided on the lower side of the touch sensor 210 (in the area of the touch pad 21 in FIG. 1), which is physically pressed in conjunction with the physical press on the touch pad 21 (touch sensor 210).

The touch pad IC 212 is an IC (for example, ASIC: Application Specific Integrated Circuit) as an operation detection unit to detect an operation on the touch pad 21. The touch pad IC 212 detects an operation on the touch pad 21 and outputs, to the main processing unit, information necessary for executing processing based on the operation.

For example, the touch pad IC 212 acquires the detection signal output from the touch sensor 210, generates touch operation information indicative of the operation position at which the touch operation is performed, and outputs the touch operation information to the main processing unit 11. Further, the touch pad IC 212 acquires a detection signal depending on whether or not the click switch 211 is pressed, generates click operation information indicative of whether or not a click operation is performed, and outputs the click operation information to the main processing unit 11.

The microphone 221 and the speakers 222 are connected to the audio system 22 that records, plays back, and outputs sound data. For example, the audio system 22 converts an audio signal of voice collected by the microphone 221 into digital audio data, and transmits the digital audio data to the main processing unit 11. Further, the audio system 22 converts audio data transmitted from the main processing unit 11 into an analog audio signal, and outputs the analog audio signal from the speaker 222 as audio.

The keyboard 32 is an input device on which multiple keys that accept user operations are arranged. As illustrated in FIG. 1, the keyboard 32 is provided on the keyboard surface 102a of the device chassis 102. The keyboard 32 outputs, to the EC 31, input information input with a user operation (for example, an operation signal indicative of a key(s) operated on the keyboard).

The power supply circuit 33 converts DC voltage supplied from an external power supply such as an AC adapter (unillustrated) or the battery 34 into plural voltages required to operate the information processing apparatus 10. Further, the power supply circuit 33 supplies power to each unit of the information processing apparatus 10 under the control of the EC 31.

The battery 34 is, for example, a lithium battery. When power is supplied from the external power supply to the information processing apparatus 10, the battery 34 is charged through the power supply circuit 33, while when no power is supplied from the external power supply to the information processing apparatus 10, the battery 34 outputs the charged power as the operating power of the information processing apparatus 10.

The Lid sensor 35 is a sensor for detecting the rotation state between the display chassis 101 and the device chassis 102 (for example, the open state, the closed state, the open angle θ, etc.). For example, as the Lid sensor 35, a Hall sensor, an acceleration sensor, or the like is used. The Lid sensor 35 outputs, to the EC 31, a detection signal according to the rotation state between the display chassis 101 and the device chassis 102.

The EC 31 is a processor such as an MCU (Micro Controller Unit) or the like, which monitors and controls various devices (peripheral devices, sensors, and the like) regardless of the system state of the information processing apparatus 10. The EC 31 includes a CPU, a ROM, a RAM, multi-channel A/D input terminal and D/A output terminal, a timer, and digital input/output terminals, which are not illustrated. To the EC 31, for example, the main processing unit 11, the touch pad 21, the keyboard 32, the power supply circuit 33, the Lid sensor 35, and the like are connected.

Figure 6:
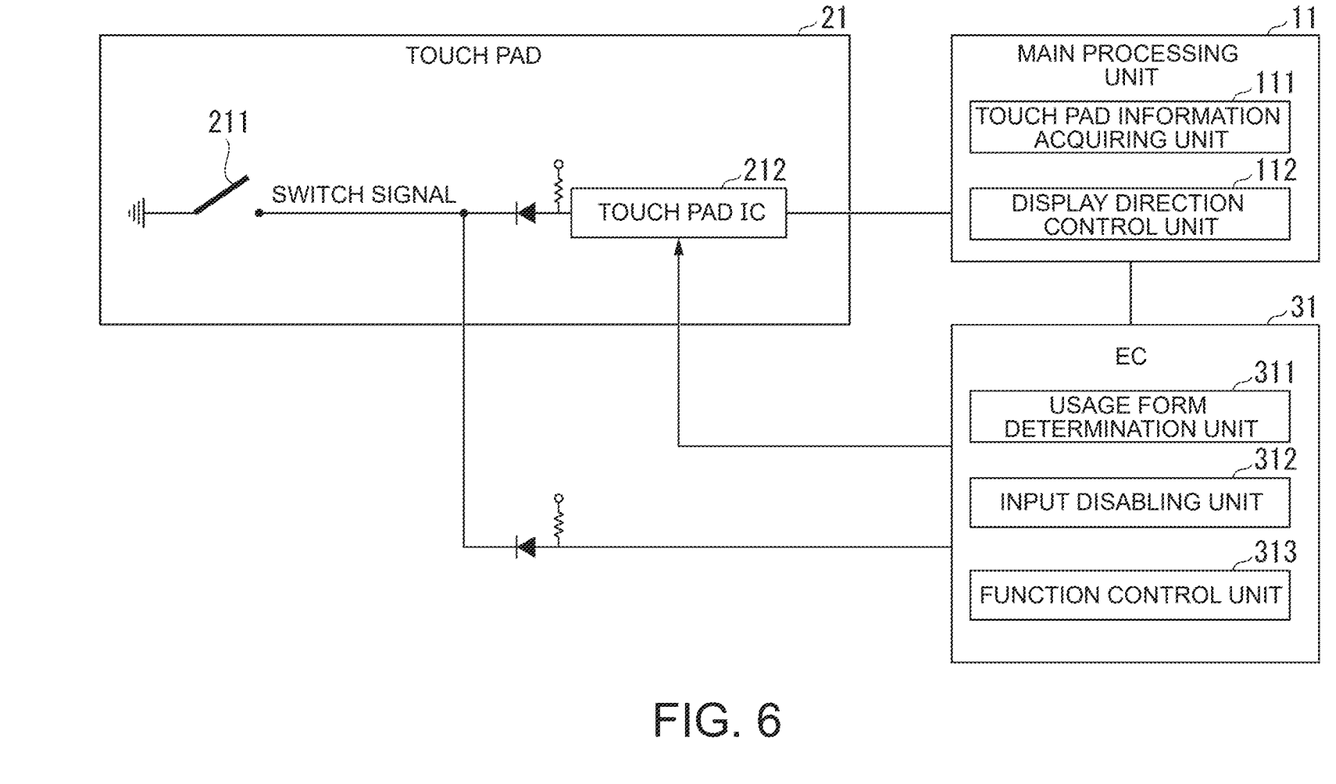
FIG. 6 is a block diagram illustrating an example of a configuration to detect a click switch according to one or more embodiments.

Referring next to FIG. 6, such a configuration that the press on the click switch 211 is detected by the EC 31, rather than by the touch pad IC 212, when the information processing apparatus 10 is in the tablet mode will be described in detail. FIG. 6 is a block diagram illustrating an example of the configuration to detect the click switch according to one or more embodiments. Note that components corresponding to respective unit in FIG. 5 are given the same reference numerals in FIG. 6.

In the example illustrated in FIG. 6, the click switch 211 is pulled up and connected to an input terminal of the touch pad IC 212 inside the touch pad 21. In a disconnected state where the click switch 211 is not pressed (a state where the click switch 211 is off), a detection signal of the click switch 211 (hereinafter called a "switch signal") is High. On the other hand, when the click switch 211 is pressed and becomes a connected state (a state where the click switch 211 is on), the switch signal of the click switch 211 becomes Low. In the clamshell mode, the touch pad IC 212 acquires the switch signal from the click switch 211, and determines whether or not the click switch 211 is pressed based on the acquired switch signal. Then, the touch pad IC 212 generates click operation information indicative of whether or not a click operation is performed based on the determination result, and outputs the click operation information to the main processing unit 11.

The main processing unit 11 is connected to the touch pad IC 212 via a serial bus such as I2C (Inter-Integrated Circuit) to acquire the click operation information (and touch operation information) from the touch pad IC 212. For example, the main processing unit 11 includes a touch pad information acquiring unit 111 and a display direction control unit 112 as functional components implemented by executing a program.

In the clamshell mode, the touch pad information acquiring unit 111 acquires the click operation information (and the touch operation information) from the touch pad IC 212, and executes processing based on the acquired operation information. This processing is the same processing as that when acquiring operation information with a mouse.

The display direction control unit 112 executes the automatic display rotation function to change the display orientation of the display unit 14 (see FIG. 3) depending on the orientation of the information processing apparatus 10 (the orientation of the display screen) detected by the direction sensor 18 (see FIG. 5).

Further, the click switch 211 is pulled up and connected to an input terminal of the EC 31 as well. Like the input to the touch pad IC 212, the input to the EC 31 becomes High in the disconnected state where the click switch 211 is not pressed (in the state where the click switch 211 is off), or the input to the EC 31 becomes Low in the connected state where the click switch 211 is pressed (in the state where the click switch 211 is on).

The EC 31 includes a usage form determination unit 311, an input disabling unit 312, and a function control unit 313 as functional components implemented by executing a program.

The usage form determination unit 311 acquires, from the Lid sensor 35 (see FIG. 5), a detection signal according to the rotation state between the display chassis 101 and the device chassis 102 to detect a usage form of the information processing apparatus 10 based on the acquired detection signal. For example, the usage form determination unit 311 determines whether or not the usage form of the information processing apparatus 10 is the tablet mode.

Further, the EC 31 is connected to the touch pad IC 212 via a control signal line for controlling the touch pad IC 212 to on or off. When predetermined conditions are met, or by a given trigger, the input disabling unit 312 outputs, to the touch pad IC 212, a control signal to turn off (to stop the operation of) the touch pad IC 212 in order to disable the touch pad IC 212 to prevent the touch pad 21 from being erroneously operated.

For example, when it is determined by the usage form determination unit 311 that the usage form of the information processing apparatus 10 is the tablet mode, the input disabling unit 312 outputs, to the touch pad IC 212, a control signal to turn off the touch pad IC 212. When acquiring, from the EC 31, the control signal to turn off the touch pad IC 212, the touch pad IC 212 stops operating. Further, when it is determined by the usage form determination unit 311 that the transition from the tablet mode to the clamshell mode is made, the input disabling unit 312 outputs, to the touch pad IC 212, a control signal to turn on (to start the operation of) the touch pad IC 212. When acquiring, from the EC 31, the control signal to turn on the touch pad IC 212, the touch pad IC 212 resumes the operation.

Further, since the click switch 211 is also connected to the input terminal of the EC 31 as described above, when the input disabling unit 312 turns off the touch pad IC 212 in the tablet mode, the function control unit 313 acquires a switch signal of the click switch 211 directly without going through the touch pad IC 212, and executes processing based on the acquired switch signal. For example, the function control unit 313 switches specific processing depending on whether or not the click switch 211 is pressed based on the acquired switch signal.

As an example, the function control unit 313 gives an instruction to the display direction control unit 112 while the click switch 211 is being pressed to perform control to lock (fix) the display orientation of the display unit 14 and to disable the automatic display rotation function. In other words, the function control unit 313 gives the instruction to the display direction control unit 112 while the click switch 211 is being pressed to lock (fix) the display orientation of the display unit 14 and to control the automatic display rotation function not to be performed.

Further, when the click switch 211 is no longer pressed, the function control unit 313 gives an instruction to the display direction control unit 112 to unlock the display orientation of the display unit 14 and to control the automatic display rotation function to enabled. In other words, when the click switch 211 is no longer pressed, the function control unit 313 gives the instruction to the display direction control unit 112 to unlock the display orientation of the display unit 14 and to control the automatic display rotation function to be performed.

[Operation of Processing]

Next, the operation of function control processing to switch the automatic display rotation function depending on the usage form of the information processing apparatus 10 will be described.

Figure 7:
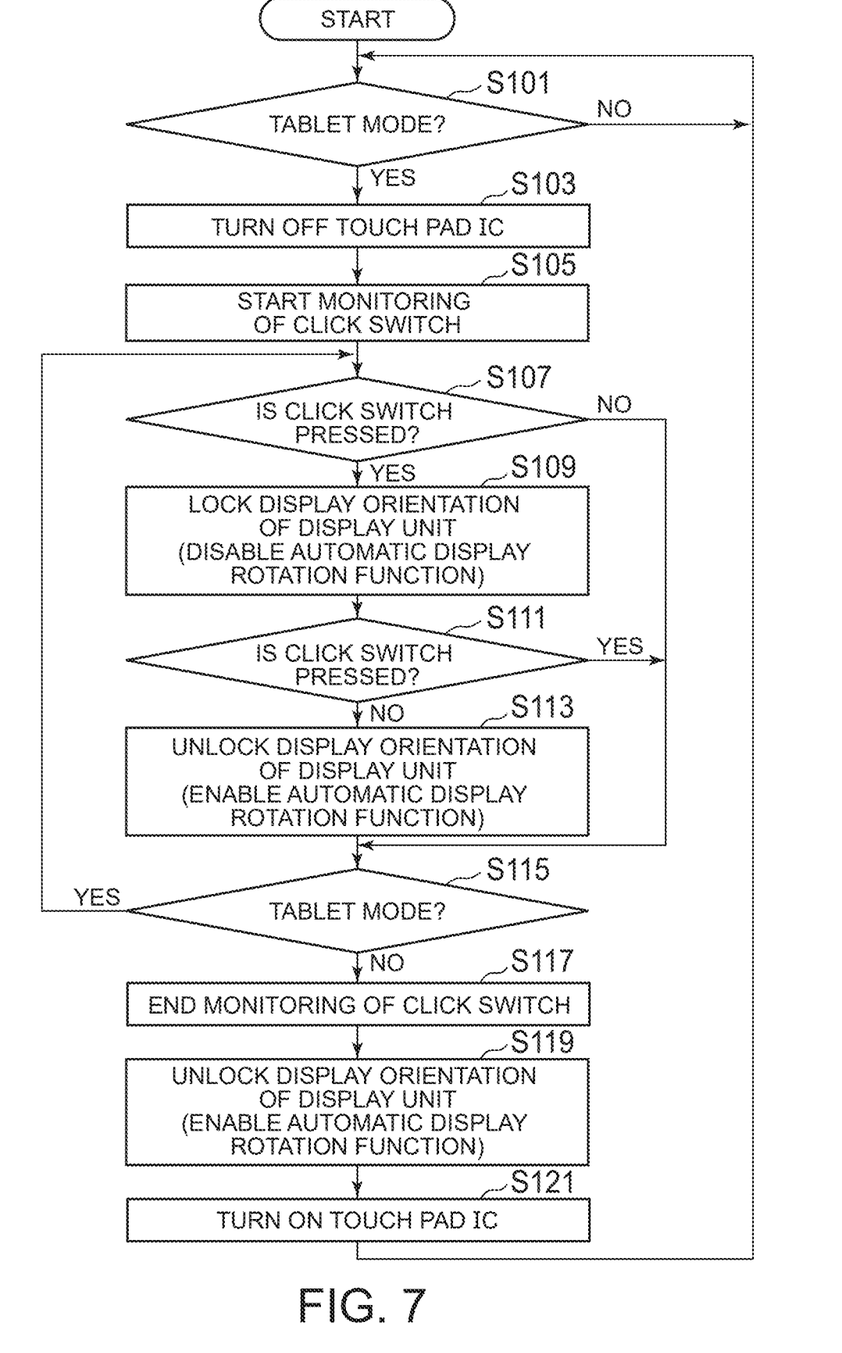
FIG. 7 is a flowchart illustrating an example of function control processing according to one or more embodiments.

FIG. 7 is a flowchart illustrating an example of function control processing according to one or more embodiments. Here, it is assumed that the usage form of the information processing apparatus 10 is the clamshell mode and the automatic display rotation function is set to enabled.

(Step S101) The EC 31 detects the usage form of the information processing apparatus 10 based on the detection signal acquired from the Lid sensor 35 to determine whether or not the usage form is the tablet mode. When determining that the usage form is not the tablet mode (NO), the EC 31 performs the process in step S101 again. On the other hand, when determining that the usage form is the tablet mode (YES), the EC 31 proceeds to a process in step S103.

(Step S103) The EC 31 outputs, to the touch pad IC 212, the control signal for turning off (for stopping the operation of) the touch pad IC 212 to turn off the touch pad IC 212. Then, the EC 31 proceeds to a process in step S105.

(Step S105) The EC 31 acquires the switch signal of the click switch 211 to start monitoring whether or not the click switch 211 is pressed. Then, the EC 31 proceeds to a process in step S107.

(Step S107) The EC 31 determines whether or not the click switch 211 is pressed based on the switch signal acquired from the click switch 211. When determining that the click switch 211 is pressed (YES), the EC 31 proceeds to a process in step S109. On the other hand, when determining that the click switch 211 is not pressed (NO)), the EC 31 proceeds to a process in step S115.

(Step S109) The EC 31 locks (fixes) the display orientation of the display unit 14 to control the automatic display rotation function to disabled. In other words, the EC 31 gives the instruction to the display direction control unit 112 to lock (fix) the display orientation of the display unit 14 while the click switch 211 is being pressed and to control the automatic display rotation function not to be performed. Then, the EC 31 proceeds to a process in step S111.

(Step S111) The EC 31 determines whether or not the click switch 211 is being pressed based on the switch signal acquired from the click switch 211. When determining that the click switch 211 continues to be pressed (YES), the EC 31 proceeds to the process in step S115. On the other hand, when determining that the click switch 211 is not pressed (NO), the EC 31 proceeds to a process in step S113.

(Step S113) The EC 31 unlocks the display orientation of the display unit 14 to control the automatic display rotation function to enabled. In other words, when the click switch 211 is no longer pressed, the EC 31 gives the instruction to the display direction control unit 112 to unlock the display orientation of the display unit 14 and to control the automatic display rotation function to be performed. Then, the EC 31 proceeds to the process in step S115.

(Step S115) The EC 31 determines whether or not the usage form is the tablet mode based on the detection signal acquired from the Lid sensor 35. When determining that the usage form continues to be the tablet mode (YES), the EC 31 returns to the process in step S107. On the other hand, when determining that the usage form is not the tablet mode (NO), the EC 31 proceeds to a process in step S117.

(Step S117) When the usage form is no longer the tablet mode (for example, when the usage form becomes the clamshell mode), the EC 31 ends monitoring whether or not the click switch 211 is pressed, and proceeds to a process in step S119.

(Step S119) When the display orientation of the display unit 14 is locked (fixed) and the automatic display rotation function is controlled to disabled, the EC 31 unlocks the display orientation and controls the automatic display rotation function to enabled. Then, the EC 31 proceeds to a process in step S121.

(Step S121) The EC 31 outputs, to the touch pad IC 212, the control signal to turn on (to start the operation of) the touch pad IC 212, thus turning on the touch pad IC 212. Then, the EC 31 returns to the process in step S101.

As described above, the information processing apparatus 10 according to one or more embodiments includes: the main memory 12 (an example of a memory) which temporarily stores a program of a system; the main processing unit 11 (an example of a first processor) which executes the program of the system; the EC 31 (an example of a second processor) provided separately from the main processing unit 11 to execute processing regardless of the operating state of the main processing unit 11; the click switch 211 (an example of an operator) for detecting a physical press; and the touch pad IC 212 (an example of an operation detection unit) which acquires a switch signal (an example of a detection signal) by the click switch 211 and outputs, to the main processing unit 11, information for executing processing based on the acquired switch signal. The EC 31 controls whether or not to stop the operation of the touch pad IC 212, and when turning off (stopping the operation of) the touch pad IC 212, the EC 31 acquires the switch signal by the click switch 211 without going through the touch pad IC 212, and executes processing based on the acquired switch signal.

Thus, when turning off (stopping the operation of) the touch pad IC 212 to disable the touch pad 21, since the information processing apparatus 10 causes the EC 31 to acquire the switch signal of the click switch 211 without going through the touch pad IC 212 so that processing can be performed, the user can make a switch to perform appropriate processing with a simple operation on the click switch 211. Further, since the information processing apparatus 10 can acquire the switch signal of the click switch 211 while turning off (stopping the operation of) the touch pad IC 212 so that the processing can be performed, it also has the advantage of reducing power consumption.

Further, the information processing apparatus 10 includes: the display chassis 101 (an example of a first chassis) with the display unit 14 provided on one surface; the device chassis 102 (an example of a second chassis) with the click switch 211 provided on one surface; and the hinge mechanism 103 through which one side of the display chassis 101 and one side of the device chassis 102 are so coupled that the display chassis 101 and the device chassis 102 are rotatable around an axis of the coupling part. Then, the EC 31 detects the rotation state between the display chassis 101 and the device chassis 102 by the hinge mechanism 103, and turns off (stops the operation of) the touch pad IC 212 based on the detected rotation state.

Thus, when the touch pad 21 is easy to be operated erroneously depending on the usage form (the rotation state between the display chassis 101 and the device chassis 102), the information processing apparatus 10 can disable the function of the touch pad 21.

For example, when detecting that the rotation state becomes a state where the other surface of the display chassis 101 and the other surface of the device chassis 102 face and overlap each other (for example, the tablet mode), the EC 31 turns off (stops the operation of) the touch pad IC 212.

Thus, when the information processing apparatus 10 is used in the tablet mode, the function of the touch pad 21 can be disabled because the touch pad 21 on the back side when the information processing apparatus 10 is being held is easy to be operated erroneously.

Further, the click switch 211 is provided in association with the touch pad 21 that detects an operation position by a touch operation in a detection area (an example of a specific area) of the touch sensor 210 on a surface of the device chassis 102 with the click switch 211 provided thereon. The touch pad IC 212 further acquires a detection signal by the touch pad 21 in addition to the switch signal by the click switch 211, and outputs, to the main processing unit 11, information for executing processing based on the acquired detection signal.

Thus, even when disabling the function of the touch pad 21, since the information processing apparatus 10 causes the EC 31 to acquire the switch signal of the click switch 211 provided in association with the touch pad 21 so that processing can be performed, the user can make a switch to perform appropriate processing with a simple operation on the click switch 211.

Further, when turning off (stopping the operation of) the touch pad IC 212, the EC 31 switches specific processing based on the switch signal acquired from the click switch 211 without going through the touch pad IC 212.

Thus, for example, in a case where the information processing apparatus 10 is used in the tablet mode, even if the function of the touch pad 21 on the back side when the information processing apparatus 10 is being held is disabled because it is easy to be operated erroneously, since the EC 31 can acquire the switch signal of the click switch 211 to switch specific processing, the user can make a switch to perform appropriate processing with a simple operation on the click switch 211.

Further, the information processing apparatus 10 includes the direction sensor 18 (an example of a sensor) for detecting the orientation of the information processing apparatus 10 (the display screen). The main processing unit 11 executes processing of the automatic display rotation function (an example of display direction change processing) to change the display orientation of the display unit 14 depending on the orientation of the information processing apparatus 10 (the display screen) detected by the direction sensor 18. When turning off (stopping the operation of) the touch pad IC 212, the EC 31 switches the processing of the automatic display rotation function (the example of the display direction change processing) based on the switch signal acquired from the click switch 211 without going through the touch pad IC 212.

Thus, for example, in the case where the information processing apparatus 10 is used in the tablet mode, even if the function of the touch pad 21 on the back side when the information processing apparatus 10 is being held is disabled because it is easy to be operated erroneously, since the EC 31 can acquire the switch signal of the click switch 211 to switch the processing of the automatic display rotation function, the user can make a switch to perform appropriate processing with a simple operation on the click switch 211.

Further, when turning off (stopping the operation of) the touch pad IC 212, the EC 31 switches whether or not to perform the processing of the automatic display rotation function (the example of the display direction change processing) based on the switch signal acquired from the click switch 211 without going through the touch pad IC 212.

Thus, for example, in the case where the information processing apparatus 10 is used in the tablet mode, even if the function of the touch pad 21 on the back side when the information processing apparatus 10 is being held is disabled because it is easy to be operated erroneously, since the EC 31 can acquire the switch signal of the click switch 211 to disable the automatic display rotation function in order to lock (fix) the display, the user can make a switch to perform appropriate processing with a simple operation on the click switch 211.

Further, a control method for the information processing apparatus 10 according to one or more embodiments is a control method for the information processing apparatus 10 including: the main memory 12 (the example of the memory) which temporarily stores a program of a system; the main processing unit 11 (the example of the first processor) which executes the program of the system; the EC 31 (the example of the second processor) provided separately from the main processing unit 11 to execute processing regardless of the operating state of the main processing unit 11; the click switch 211 (the example of the operator) for detecting a physical press; and the touch pad IC 212 (the example of the operation detection unit) which acquires a switch signal (the example of the detection signal) by the click switch 211 and outputs, to the main processing unit 11, information for executing processing based on the acquired switch signal, the control method including: a step of causing the EC 31 to control whether or not to stop the operation of the touch pad IC 212; a step in which, when turning off (stopping the operation of) the touch pad IC 212, the EC 31 acquires the switch signal by the click switch 211 without going through the touch pad IC 212; and a step of causing the EC 31 to execute processing based on the acquired switch signal.

Thus, when turning off (stopping the operation of) the touch pad IC 212 to disable the touch pad 21, since the control method for the information processing apparatus 10 causes the EC 31 to acquire the switch signal of the click switch 211 without going through the touch pad IC 212 so that processing can be performed, the user can make a switch to perform appropriate processing with a simple operation on the click switch 211. Further, since the control method for the information processing apparatus 10 can acquire the switch signal of the click switch 211 while turning off (stopping the operation of) the touch pad IC 212 so that the processing can be performed, it also has the advantage of reducing power consumption.

While the embodiments of this invention have been described in detail with reference to the accompanying drawings, the specific configurations are not limited to those described above, and various design changes and the like are possible without departing from the scope of this invention.

Note that the example in which the click switch 211 is placed on the lower side of the touch pad 21 (the touch sensor 210) is described in the aforementioned embodiments, but the position at which the click switch 211 is provided and the switch form are not limited to this example. For example, the click switch 211 may also be placed in a position that does not overlap with the touch sensor 210 as the detection area of the touch pad 21. Further, the number of click switches 211 is not limited to one, and it may be two or more.

Further, in the aforementioned embodiments, the example in which the display orientation of the display unit 14 is locked (fixed) while the click switch 211 is being pressed (that is, while being long pressed) in the tablet mode to control the automatic display rotation function to disabled, and when the click switch 211 is no longer pressed, the display orientation of the display unit 14 is unlocked to control the automatic display rotation function to enabled is described, but the method of operating the click switch 211 is not limited to this example. For example, such a configuration as to switch between locking (fixing) and unlocking of the display orientation every time the click switch 211 is pressed may also be made. In this case, the type of operation on the click switch 211 may be any operation such as single click, double click, triple click, or the like.

Further, in the aforementioned embodiments, the example in which, when turning off (stopping the operation of) the touch pad IC 212, the EC 31 switches the automatic display rotation function between enabled and disabled based on the switch signal acquired from the click switch 211 without going through the touch pad IC 212 is described, but the present invention is not limited to this example. For example, the information processing apparatus 10 may control the automatic display rotation function to disabled in the tablet mode to control the display orientation to a display orientation preset depending on whether or not the click switch 211 is pressed. For example, the information processing apparatus 10 may lock (fix) the display orientation to a display orientation when the orientation of the display screen is at 0° illustrated in FIG. 3 while the click switch 211 is being pressed, or may lock (fix) the display orientation to a display orientation when the display screen is rotated 90° to the right illustrated in FIG. 3 while the click switch 211 is not pressed. Further, the display orientation preset depending on whether or not the click switch 211 is pressed may be settable by the user.

Further, when the click switch 211 is not pressed, the information processing apparatus 10 may lock (fix) the display orientation to a display orientation when the orientation of the display screen is at 0° illustrated in FIG. 3, and then make a transition every time the click switch 211 is pressed, such as to be locked to a display orientation when the display screen is rotated 90° to the right, to be locked to a display orientation when the display screen is rotated 180° to the right, or to be locked to a display orientation when the display screen is rotated 270° to the right. Further, the information processing apparatus 10 may preset the display orientation to be locked for each type of operation on the click switch 211 (long press, single click, double click, or triple click). Further, the type of operation on the click switch 211 and the display orientation setting may be settable by the user.

Further, in the aforementioned embodiments, the example in which, when turning off (stopping the operation of) the touch pad IC 212, the EC 31 switches the automatic display rotation function based on the switch signal acquired from the click switch 211 without going through the touch pad IC 212 is described, but the function to be switched is not limited to the automatic display rotation function, and any other specific function may also be switched.

For example, when turning off (stopping the operation of) the touch pad IC 212, the EC 31 may also switch, between enabled and disabled, the function of the touch panel 15 that detects a touch operation on the display screen of the display unit 14 based on the switch signal acquired from the click switch 211 without going through the touch pad IC 212.

Further, when turning off (stopping the operation of) the touch pad IC 212, the EC 31 may switch the display of the display unit 14 on and off based on the switch signal acquired from the click switch 211 without going through the touch pad IC 212.

Further, when turning off (stopping the operation of) the touch pad IC 212, the EC 31 may switch whether or not to mute the microphone 221 or the speakers 222 based on the switch signal acquired from the click switch 211 without going through the touch pad IC 212.

Further, when turning off (stopping the operation of) the touch pad IC 212, the EC 31 may switch whether to turn on or off the Wi-Fi (registered trademark) function of the communication unit 16 based on the switch signal acquired from the click switch 211 without going through the touch pad IC 212.

Further, a switching function may be allocated to each type of operation on the click switch 211 (long press, single click, double click, or triple click). For example, the switching function may be allocated to each type of operation, such as to switch the automatic display rotation function in the case of long press, to switch the function of the touch panel 15 in the case of single click, to switch the display on and off in the case of double click, or to switch the microphone 221 or the speakers 222 to be muted and unmuted in the case of triple click. Further, the allocation of the function for each type of operation may be settable by the user.

Further, in the aforementioned embodiments, the touch pad IC 212 is turned off (the operation thereof is stopped) when the information processing apparatus 10 is in the tablet mode, but the touch pad IC 212 may also be turned off (the operation thereof may also be stopped) by any other factor (for example, when predetermined conditions are met, or by a given trigger), and at that time, the EC 31 may acquire the switch signal of the click switch 211 to perform processing. Further, the predetermined conditions or the given trigger may be depending on the rotation state between the display chassis 101 and the device chassis 102, or may be unrelated to the rotation state.

Further, the EC 31 is an example of a microcomputer as a processor different from the main processing unit 11, but it is not limited to this example.

Further, the information processing apparatus 10 described above has a computer system therein. Then, a program for implementing the function of each component included in the information processing apparatus 10 described above may be recorded on a computer-readable recording medium so that the program recorded on this recording medium is read into the computer system and executed to perform processing in each component included in the information processing apparatus 10 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 10, or delivery servers for delivering respective divided pieces of the program may be different from one another. Further, it is assumed that the "computer-readable recording medium" includes a medium on which the program is held for a given length of time, such as a volatile memory (RAN) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing apparatus 10 in the embodiments described above may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

DESCRIPTION OF SYMBOLS 10 information processing apparatus
101 display chassis
101a display surface
101b top surface
102 device chassis
102a keyboard surface
102b bottom surface
103 hinge mechanism
11 main processing unit
12 main memory
13 video subsystem
14 display unit
15 touch panel
16 communication unit
17 storage unit
18 direction sensor
21 touch pad
210 touch sensor
211 click switch
212 touch pad IC
22 audio system
221 microphone
222 speaker
31 EC
32 keyboard
33 power supply circuit
34 battery
35 Lid sensor
111 touch pad information acquiring unit
112 display direction control unit
311 usage form determination unit
312 input disabling unit
313 function control unit

What is claimed is:

1. An information processing apparatus comprising:
   a memory which temporarily stores a program of a system;
   a first processor which executes the program of the system;
   a second processor provided separately from the first processor to execute processing regardless of an operating state of the first processor;
   an operator for detecting a physical press; and
   an operation detection unit which acquires a detection signal by the operator and outputs, to the first processor, information for executing processing based on the acquired detection signal,
   wherein the second processor controls whether or not to stop operation of the operation detection unit, and when stopping the operation of the operation detection unit, the second processor acquires the detection signal by the operator without going through the operation detection unit, and executes processing based on the acquired detection signal.

2. The information processing apparatus according to claim 1, further comprising:
   a first chassis with a display unit provided on one surface;
   a second chassis with the operator provided on one surface; and
   a hinge mechanism through which one side of the first chassis and one side of the second chassis are so coupled that the first chassis and the second chassis are rotatable around an axis of a coupling part,
   wherein the second processor detects a rotation state between the first chassis and the second chassis by the hinge mechanism, and stops the operation of the operation detection unit based on the detected rotation state.

3. The information processing apparatus according to claim 2, wherein when detecting that the rotation state becomes a state where the other surface of the first chassis and the other surface of the second chassis face and overlap each other, the second processor stops the operation of the operation detection unit.

4. The information processing apparatus according to claim 2, wherein
   the operator is provided in association with a touch pad that detects an operation position by a touch operation in a specific area on a surface of the second chassis with the operator provided thereon, and
   the operation detection unit further acquires a detection signal by the touch pad in addition to the detection signal by the operator, and outputs, to the first processor, information for executing processing based on the acquired detection signals.

5. The information processing apparatus according to claim 2, further comprising a sensor for detecting an orientation of the information processing apparatus, wherein
   the first processor executes display direction change processing to change a display orientation of the display unit depending on the orientation of the information processing apparatus detected by the sensor, and
   when stopping the operation of the operation detection unit, the second processor switches the display direction change processing based on the detection signal acquired from the operator without going through the operation detection unit.

6. The information processing apparatus according to claim 5, wherein when stopping the operation of the operation detection unit, the second processor switches whether or not to perform the display direction change processing based on the detection signal acquired from the operator without going through the operation detection unit.

7. The information processing apparatus according to claim 1, wherein when stopping the operation of the operation detection unit, the second processor switches specific processing based on the detection signal acquired from the operator without going through the operation detection unit.

8. A control method for an information processing apparatus including: a memory which temporarily stores a program of a system; a first processor which executes the program of the system; a second processor provided separately from the first processor to execute processing regardless of an operating state of the first processor; an operator for detecting a physical press; and an operation detection unit which acquires a detection signal by the operator and outputs, to the first processor, information for executing processing based on the acquired detection signal, the control method comprising:
- a step of causing the second processor to control whether or not to stop operation of the operation detection unit;
- a step in which, when stopping the operation of the operation detection unit, the second processor acquires the detection signal by the operator without going through the operation detection unit; and
- a step of causing the second processor to execute processing based on the acquired detection signal.

* * * * *